United States Patent [19]

Inou et al.

[11] Patent Number: 4,783,851
[45] Date of Patent: Nov. 8, 1988

[54] OPTICAL COMMUNICATION SYSTEM

[75] Inventors: Kiyoharu Inou; Seiichi Naito; Yoshihiro Sampei, all of Tokyo, Japan

[73] Assignee: Yokogawa Electric Corporation, Tokyo, Japan

[21] Appl. No.: 692,684

[22] Filed: Jan. 18, 1985

[30] Foreign Application Priority Data

Jan. 27, 1984 [JP] Japan .................................. 59-13962
Jan. 27, 1984 [JP] Japan .................................. 59-13963
Jan. 30, 1984 [JP] Japan .................................. 59-14688

[51] Int. Cl.⁴ .......................................... H04B 9/00
[52] U.S. Cl. ................................ 455/612; 350/96.14; 350/374; 350/401
[58] Field of Search ................ 455/601, 612, 605; 350/96.13, 96.14, 96.16, 96.15, 374, 382, 400, 401

[56] References Cited

U.S. PATENT DOCUMENTS 4,201,450 5/1980 Trapani ............................... 350/374
4,252,402 2/1981 Puech et al. ....................... 350/96.14
4,461,543 7/1984 McMahon ........................... 350/382
4,501,021 2/1985 Weiss ..................................... 370/88

FOREIGN PATENT DOCUMENTS 55-73152 6/1980 Japan ................................. 455/601
57-155514 9/1982 Japan ............................... 350/96.13
59-3403 1/1984 Japan ............................... 350/96.13

Primary Examiner—Robert L. Griffin
Assistant Examiner—L. Van Beek
Attorney, Agent, or Firm—Moonray Kojima

[57] ABSTRACT

The optical communication system of the invention comprises an optical transmission line, optical coupling devices, each having a varying coupling ratio, connected to the transmission line, and stations connected to the optical coupling devices; wherein the coupling ratio of the device is changed to a predetermined value by a control signal applied by its associated station, depending on the state of transmission and reception, level of received signal, operating state of the station, and the like, to thereby provide high reliability, reduced transmission delay and low error rate, as well as to thereby decrease the amount of attenuation between transmitting and receiving stations.

6 Claims, 9 Drawing Sheets

OPTICAL COMMUNICATION SYSTEM

BACKGROUND OF THE INVENTION

1. Field of Invention

This invention relates to optical communication systems, and more particularly to improvements thereof.

2. Description of the Prior Art

FIG. 1 is a block diagram depicting a conventional optical communication system of the multi-drop type. Although only one-way transmission is shown, in practice, two way transmission is used. Stations ST11, ST12, ..., ST1N are respectively connected by optical coupling devices A11, A12, ..., A1N, to an optical transmission line L1.

FIG. 2 is an explanatory view depicting an optical coupler used as the device A11, ..., A1N of FIG. 1. Optical input signals I11 and I12 are respectively separated into two paths by a half mirror 10, to produce optical output signals O11 and O12. Assuming the optical transmittance of the half mirror 10 to be $\alpha 1$, there then exists the following relationship:

$$\begin{bmatrix} O11 \\ O12 \end{bmatrix} = \begin{bmatrix} 1-\alpha 1 & \alpha 1 \\ \alpha 1 & 1-\alpha 1 \end{bmatrix} \begin{bmatrix} I11 \\ I12 \end{bmatrix}$$

and the coupling ratio is fixed.

Since this system is comprised of passive elements, disadvantageously, a large attenuation occurs between the transmitting stations and the receiving stations. On the other hand, this system provides some degree of reliability, acceptable transmission delay and error rate, as compared with a loop type optical communication system for performing regenerative repeating.

The maximum attenuation results when the transmission and reception between stations ST11 and ST1N, has a transmission gain G1 which can be represented by the following:

$$G1 = \alpha 1^2 (1-\alpha 1)^{N-2}$$

The gain is maximum at $\alpha 1 = N/2$, which is substituted into the above equation to express the maximum transmission gain Gt1 by the following equation:

$$Gt1 = (2/N)^2 (1-2/N)^{N-2} \quad (1)$$
$$\approx 4e^{-2} N^{-2} \quad (N \gg 1)$$

That is, since the attenuation increases in proportion to $N^2$, it can not actually be practiced if the scale of the system is enlarged.

In the conventional loop type optical communication system using an optical switch as the optical coupling device, the regenerative repeating is performed when each of the stations operates normally, that is, when a fundamental 1:1 transmission is carried out. If there should occur an abnormality in the operation of a station (for example, disconnection of a power source), the optical switch is suitably operated to bypass the relevant station. In this prior system, although attenuation between transmitting and receiving stations is not particularly troublesome, there is a deficiency in that a delay is enlarged due to the repeating regeneration of signals and communication errors are accumulated to increase the error rate.

Furthermore, in the conventional multi-drop type optical communication system using optical couplers, repeaters are usually inserted in the optical transmission line in order to recover the attenuation of the signals accompanying the increase in the number of nodes (each of the nodes comprises an optical coupling device, a station and the like) and the distance covered. Accordingly, although the optical coupling device for each of the stations is composed of passive elements and hence can provide good reliability, reduced transmission delay and low error rate, these characteristics are impaired at the portion of the repeater whereat active elements are used.

SUMMARY OF THE INVENTION

An object of the invention is to overcome the aforementioned and other deficiencies and disadvantages of the prior art.

Another object is to provide an optical communication system wherein the coupling ratio of each optical coupling device is changed to a dynamic and continuous predetermined value by application of control signals which depend upon the state of transmission and reception, level of received signal, state of the associated station, and the like, thereby to attain high reliability, reduced transmission delay and low error rate, as well as to decrease the amount of attenuation between the transmitting and receiving stations.

DETAILED DESCRIPTION OF PREFERRED EMBODIMENTS

Figure 3:
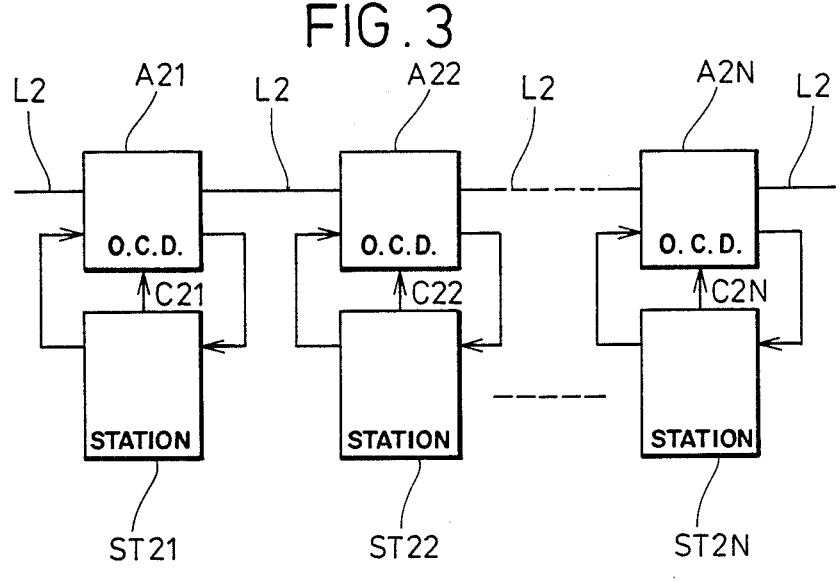
FIG. 3 is a block diagram depicting an illustrative embodiment of the invention.

Turning now to FIG. 3, a multi-drop type of system is depicted comprising a multi-drop type optical transmission line L2; optical coupling devices A21,A22, ..., A2N for connection with line L2; and stations ST21, ST22, ..., ST2N for connection with respective optical coupling devices A21, A22, ..., A2N, as depicted. Although the system is shown being for one way transmission and receiving, in practice, such transmission and reception is usually two directional.

Each of stations ST21,ST22, ..., ST2N changes the coupling ratio of each of the optical coupling devices associated therewith A21, A22, ..., A2N, to a dynamic and continous value by applying thereto control signals C21, C22, ..., C2N. The control signals may depend on such factors as state of transmission and reception, level of received signal, state of the concerned station, and the like. The block diagrams and components herein are representational, and other components, such as control means, not shown, are to be understood to be used herein.

Figure 4:
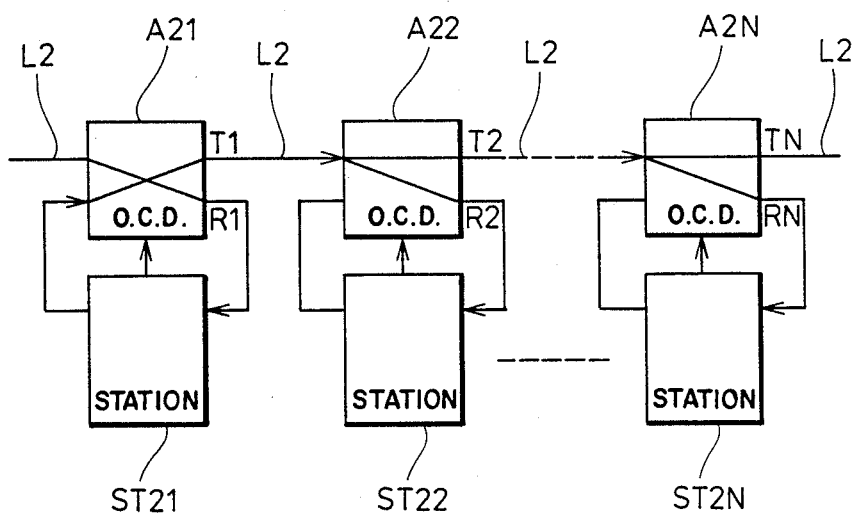
FIG. 4 is an explanatory view depicting operation of the system of FIG. 3.

FIG. 4 shows a case when only station ST21 is placed in a transmission mode while the other stations are placed in receiving modes.

Figure 5:
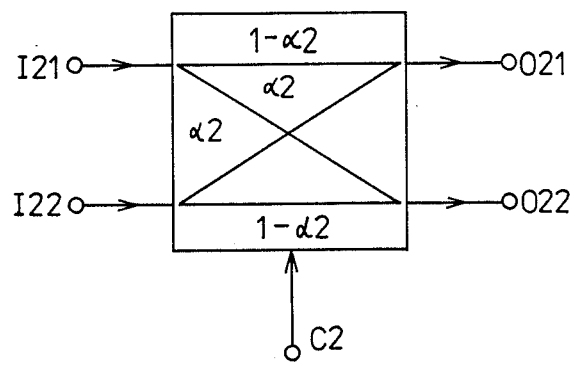
FIG. 5 is an explanatory view depicting the input/output relationship of the optical coupling device of FIG. 3.

FIG. 5 shows the input/output relationship in the optical coupling device, e.g. of FIG. 3, with the coupling ratio of the coupling device being set at $\alpha 2$. The following relationship is established between optical input signals I21, I22 and optical output signals O21, O22:

$$\begin{bmatrix} O21 \\ O22 \end{bmatrix} = \begin{bmatrix} 1-\alpha 2 & \alpha 2 \\ \alpha 2 & 1-\alpha 2 \end{bmatrix} \begin{bmatrix} I21 \\ I22 \end{bmatrix}$$

By controlling the foregoing coupling ratio $\alpha 2$ to be 1 during transmission and to a predetermined value $\alpha$ which is less than 1 during reception, the transmission gain G2 in the case of transmission and reception between the stations ST11 and ST1N which produces maximum attenuation can be represented by the following equation:

$$G2 = \alpha(1-\alpha)^{N-2}$$

The transmission gain is maximum at $\alpha = 1/(N-1)$, which can be substituted into the foregoing equation to represent the maximum transmission gain Gt2 by the following equation:

$$\begin{aligned} Gt2 &= (1 - 1/(N-1))^{N-2}/(N-1) \\ &\approx e^{-1}/(N-1)(N \gg 1) \\ &\approx e^{-1}/N \end{aligned} \quad (2)$$

That is, the attenuation is in proportion to N.

Figure 1:
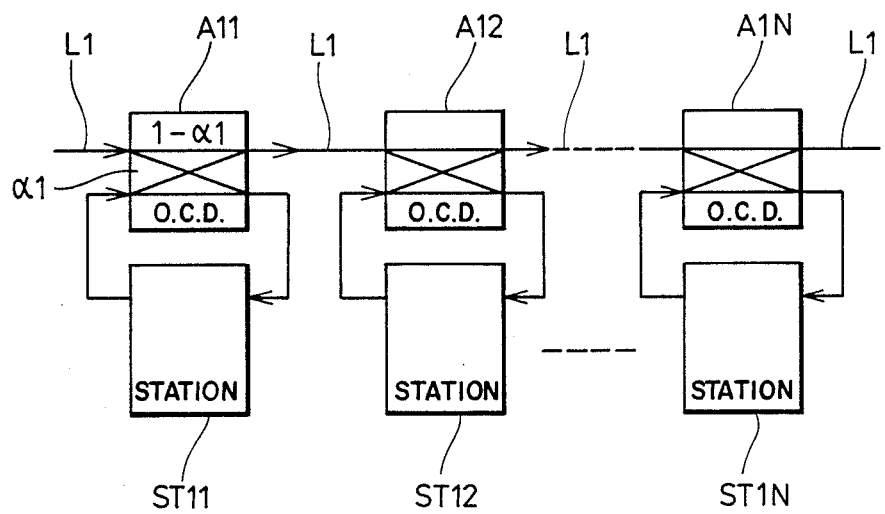
FIG. 1 is a block diagram depicting a conventional optical communication system.
Figure 2:
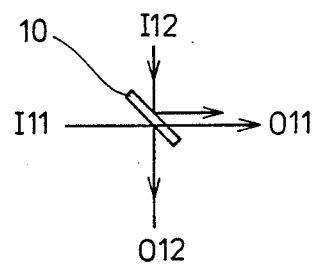
FIG. 2 is an explanatory view depicting operation of the coupler device of FIG. 1

The maximum transmission gain Gt1 in the conventional embodiment shown in FIG. 1 is in proportion to $N^{-2}$, as seen in equation (1), whereas the maximum transmission gain Gt2 in the FIG. 3 embodiment is in proportion to $N^{-1}$, as seen in equation (2). Accordingly, the invention has a decreased attenuation amount as compared to the conventional multi-drop type optical communication system. On the other hand, if the attenuation amount is assumed to be identical for both types of systems, the number of stations can be increased in the invention system. That is, by assuming the gain to be equal in both equations (1) and (2), that is $$Gt1 = Gt2 = Gt$$

while setting the number of stations as N1 in the conventional system and as N2 in the invention, it can be rewritten as:

$$4e^{-2}N1^{-2} = e^{-1}N2^{-1}$$

and the equation can be solved as:

$$N1 = 2e^{-1}\sqrt{Gt^{-1}}$$

$$N2 = e^{-1}Gt^{-1} = eN2^{1}/4$$

Considering the value Gt, for example, as being $-20$ dB (1/100), $$N1 = 7.35$$

$$N2 = 36.8$$

Then, 36 stations can be connected in the FIG. 3 embodiment, as compared with 7 station in the conventional system. This result is commercially to great advantage in terms of reduced cost, increased reliability and improved maintenance cost.

Figure 6:
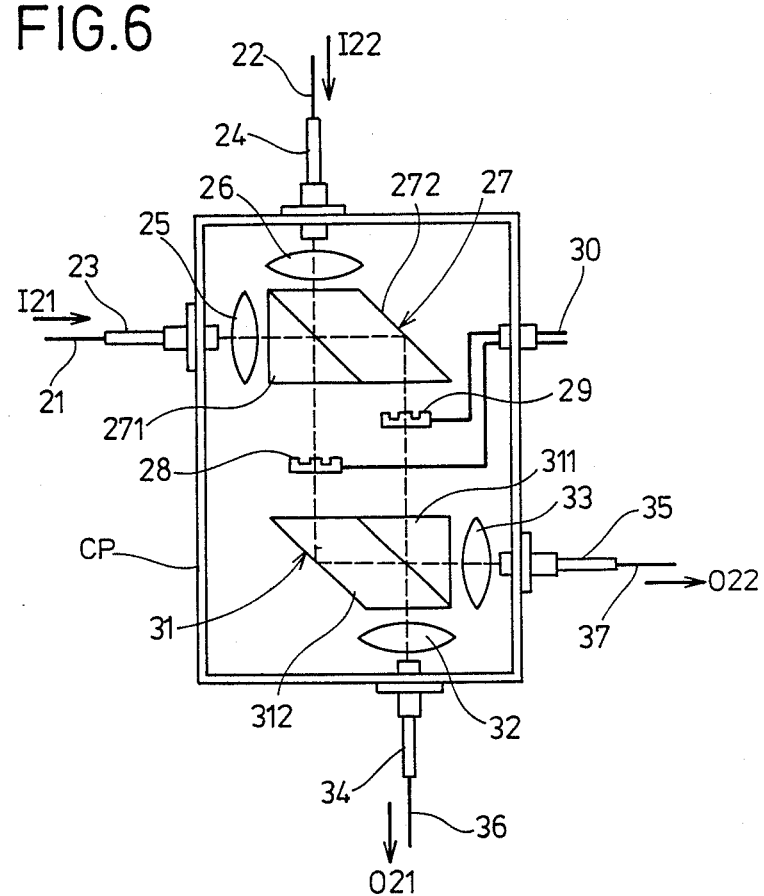
FIG. 6 is an explanatory view depicting an illustrative coupling device.

FIG. 6 is an explanatory view showing an example of an optical coupling device which may be used as the device A21,A22, ..., A2N in FIG. 3. The optical coupling device is a high speed optical switch utilizing an electro-optic effect device known as a PLZT (which comprises lead lanthanum zirconate titanate). The PLZT is a ferro-electric, ceramic electro-optical material whose optical properties can be changed by application of an electric field, or tension force or compression force. Optical fibers 21,22 guide optical input signals I21 and I22, respectively, and optical fiber connectors 23 and 24 couple optical fibers 21,22, respectively, to housing or section CP, as depicted.

The portion of housing or sector CP shown surrounded by dual solid lines represent an optical coupling section, wherein the temperature is preferably maintained at a predetermined level, such as between preferably 50° and 100° C. In optical coupling sector CP, there are disposed lenses 25,26 for focusing or condensing input lightrays entering through optical fiber connectors 23,24, respectively. A polarizing separator 27 is disposed in section CP and comprises a combination of a beam splitter 271 and a total reflection prism 272, through which input light rays enter through the lenses 25 and 26. There are also shown in section CP, PLZT 28,29 disposed so that two polarized waves outgoing, respectively, from separator 27 are irradiated and connected to drive terminal 30 for applying a control signal to each of the PLZT 28,29. A polarized light synthesizer 31 is disposed in section CP and comprises a combination of a beam splitter 311 and a total reflection prism 312, into which the light enters after passage through each of PLZT 28 and 29. There are further shown lenses 32,33 which are disposed in housing CP so as to be in focal arrangement with PLZT 28 and 29, respectively. Optical fiber connectors 34,35 passes outgoing light signals from polarized light synthesizer 31 after having passed through lenses 32,33, and guides the light signals as optical output signals O21 and O22, to and through optical fibers 36 and 37 respectively.

The optical coupling device of FIG. 6 operates as follows. In the section CP, the light incident through lens 25 to polarizing separator 27 is separated into an S wave and a P wave (not labeled in the drawing). The P wave enters into PLZT 29 and the S wave enters into PLZT 28, respectively.

Unless a control voltage is applied, PLZT 28 and 29 produce no electro-optical effect. Accordingly, the P wave passes through PLZT 29 and the S wave passes through PLZT28, and both waves are then outputted through optical fiber connector 34, to the side of optical fiber 36.

On the other hand, when a control voltage is applied to each of PLZT 28,29, an electro-optical effect is produced by which the P wave is converted into an S wave, and the S wave is converted into a P wave, with each of their polarizing planes being rotated by 90°. As a result, both of the light wave passing through the PLZT 28 and formed into the P wave, and the light wave passing through the PLZT 29 and formed into the S wave, enter into the polarized light synthesizer 31, and thereafter, are outputted through lense 33 and optical fiber connector 35, to the side of optical fiber 37.

In a similar manner, the light rays passing through lense 26 and incident upon polarizing separator 27 is also outputted to optical fiber 37, unless a control voltage is applied to PLZT 28 and 29, while, on the other hand, such light rays are outputted to the side of optical fiber 36 when a control voltage is applied to PLZT 28,29.

Figure 7:
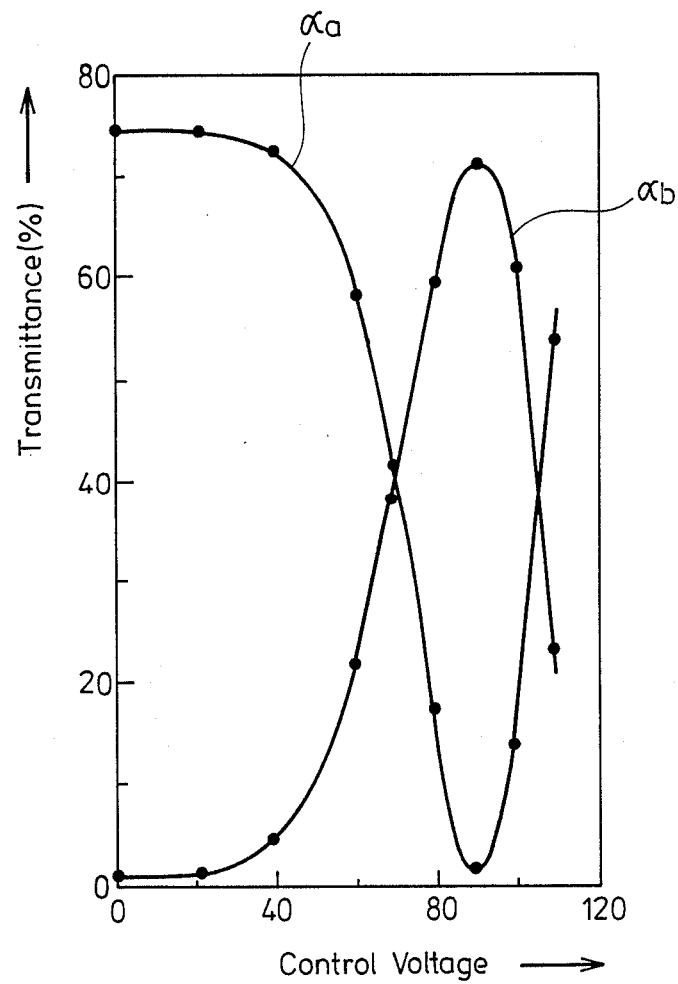
FIG. 7 is a graph depicting characteristic curves of input and output characteristics of the optical coupling device of FIG. 6.

In the system just described system, the optical input signals I21 and I22 can be switched to the output O21 or O22 by suitable application of the control signals. If control voltage is 0 volts, the optical input I21 forms the optical output O21, while the optical input I22 forms the optical output O22. Then, as the control voltage increases from 0, the optical input I21 transfers to the optical output O22 and the optical input I22 transfers to the optical output O21 gradually. FIG. 7 depicts characteristic curves showing the described effect. In the graph, the changes are shown of optical transmittance αa from I21 to O21 and the optical transmittance αb from I21 to O22, depending on the control voltage as actually measured. Thus, the optical transmittance can optionally and continuously be controlled by suitable application of control voltage.

Since the coupling ratio can be changed to an optical dynamic and continuous value during communication, advantageously, the embodiment can realize high reliability, reduced transmission delay, and low error rate, as well as decreased loss between transmission and reception, by simply switching the coupling ratio to be higher upon transmission or to be lower upon reception.

Figure 8:
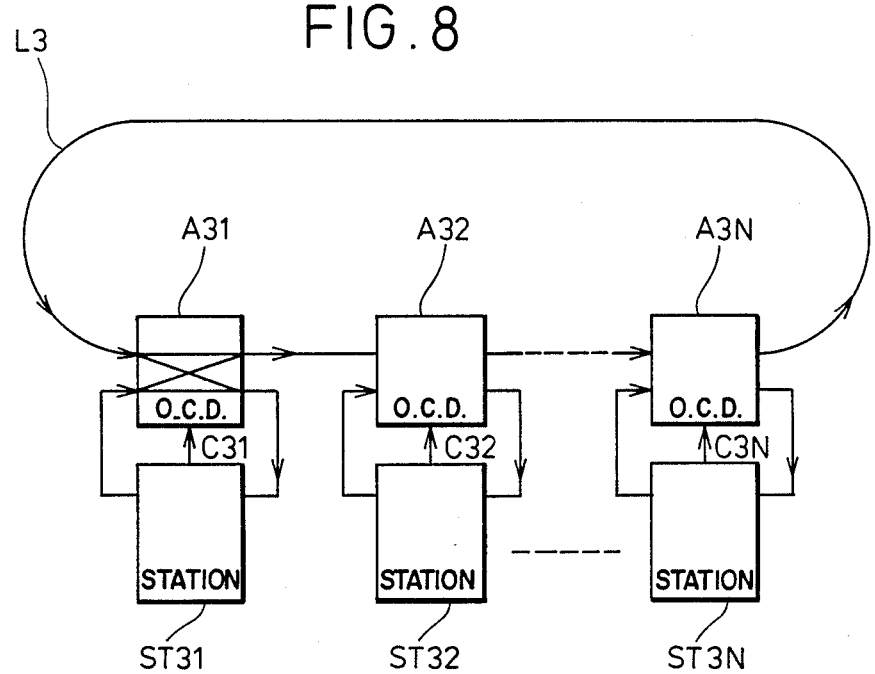
FIG. 8 is a block diagram depicting another illustrative embodiment of the invention.

FIG. 8 depicts another illustrative embodiment comprising a loop type optical transmission line L3; optical coupling devices A31,A21, . . . , A3N, each having a variable coupling ratio, connected to the line L3; and stations ST31, ST32, . . . , ST3N connected to devices A31, A32, . . . , A3N, respectively, as depicted. The same coupling devices shown in FIGS. 5, 6, 7, may be used as the optical coupling devices A31,A32, . . . , A3N.

Each of stations ST31, ST32, . . . , ST3N may vary the coupling ratio of an associated coupling device A31,A32, . . . , A3N, to an optional value by applying to the associated device, control signals C31, C32, . . . , C3N. The control signals may depend on such factors as transmission and reception state, level of received signals, state of the associated station, and the like.

Figure 9:
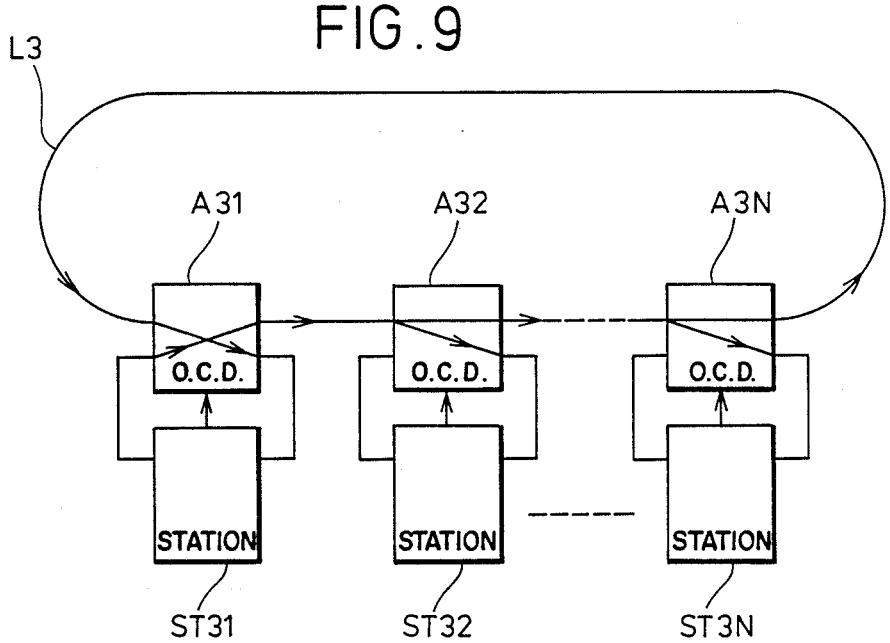
FIG. 9 is an explanatory view depicting operation of the system of FIG. 8.

FIG. 9 shows a case wherein only station ST31 is placed in a transmission mode, while the other stations are placed in receiving modes. By controlling the coupling ratio of the coupling device in the same manner as that in the FIG. 3 embodiment, advantageously, the attenuation amount can be also decreased, as compared with the conventional multi-drop type system; or, also advantageously, the number of stations can be increased when the attenuation amount is the same.

Furthermore, and advantageously, since no regenerative repeaters are inserted into the system, the delay in the signal reception is decreased and the error rate does not increase as compared with the conventional system, of the loop type.

Moreover, advantageously, since the transmission signals return to their own stations, it is possible to readily measure the distance of the transmission line and the amount of attenuation and also detect the abnormality in the transmission line.

Also, advantageously, various techniques relevant to conventional loop transmission (such as loop back, etc) can also be utilized in the invention.

Figure 10:
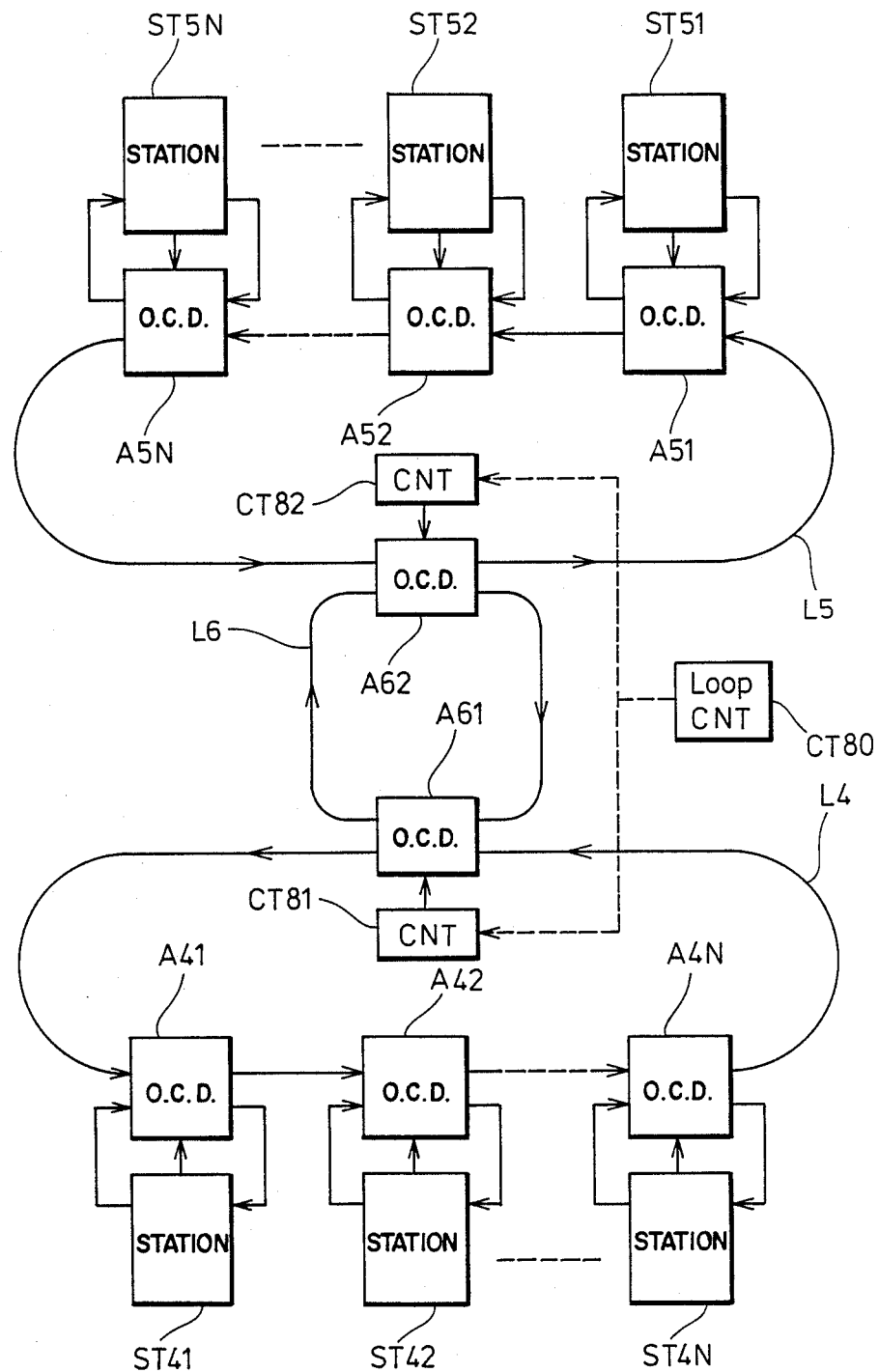
FIG. 10 is a block diagram of a further illustrative embodiment of the invention.

FIG. 10 depicts another illustrative embodiment of the invention, wherein two loop types of optical systems, such as those depicted in FIG. 8, are used, together with a third loop type system and further optical coupling devices. This embodiment is substantially an application of the FIG. 8 embodiment.

In the system, there are stations ST41, ST42, . . . , ST4N coupled by optical coupling devices A41, A42, . . . , A4N, respectively, to loop type optical transmission line L4; and stations ST51, ST52, . . . , ST5N are coupled by optical coupling devices A51,A52, . . . , A5N, respectively, to another loop type optical transmission line L5., as depicted.

Optical transmission line L4 and optical transmission line L5 are coupled by optical coupling devices A61 and A62, respectively, to loop type optical transmission line L6. The same type of optical coupling devices, as shown in FIGS. 5, 6, 7, may be used as the devices A41,A42, . . . ,, A4N; and A51,A52, . . . , A5N; and A61 and A62. The devices A61 and A62 are controlled as to their switching by control means CT81 and CT82, respectively. Loop control means CT80 controls control means CT81 and 82.

Figure 11:
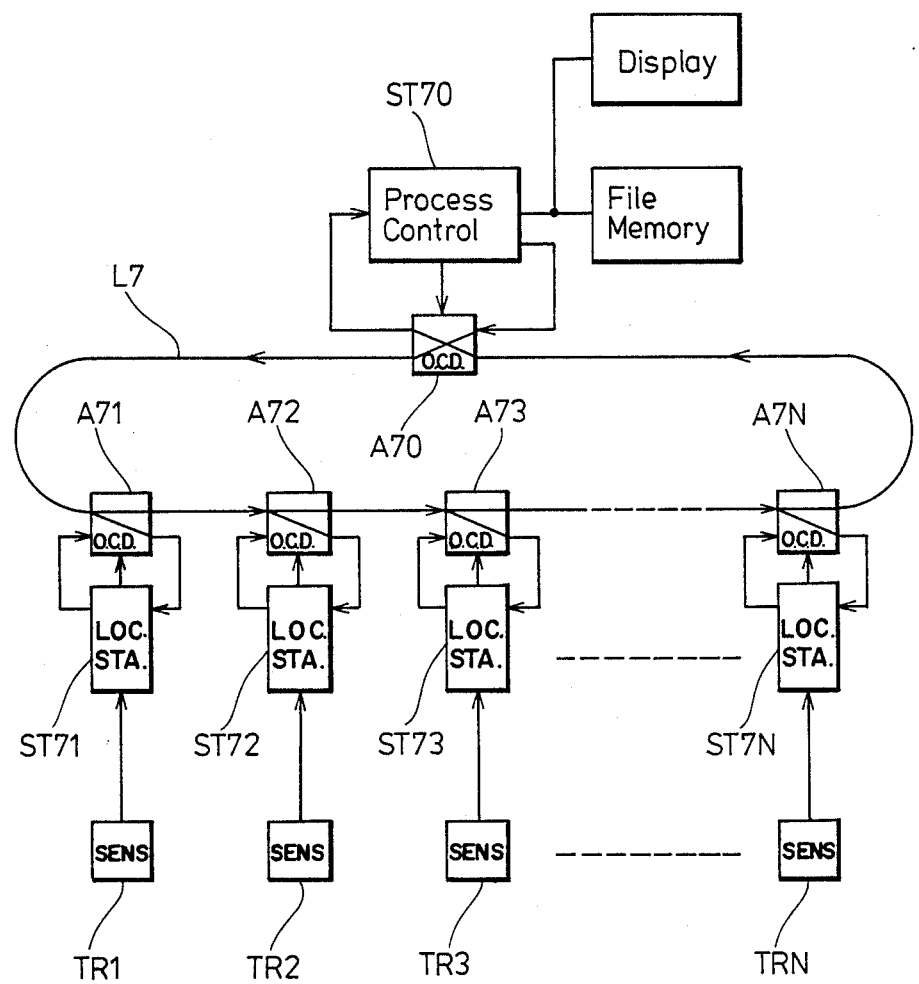
FIG. 11 is a block diagram depicting a still further illustrative embodiment of the invention.

FIG. 11 is a block diagram of another illustrative embodiment involving another application of the FIG. 8 embodiment. Sensors TR1, TR2, . . . , TRN for detecting various factors, such as, for example, process components, such as temperature, pressure and flow rate, are connected to local stations ST71, ST72, . . . , ST7N, respectively. The local stations ST71, ST72, . . . , ST7N, are coupled by optical coupling devices A71, A72, . . . , A7N, respectively, to loop type optical transmission line L7. The loop type optical transmission line L7 is connected by an optical coupling device A70 to a control station ST70. These coupling devices may be the same as those shown in FIGS. 5, 6, 7. The address signal sent out from control station ST70, is interpreted in each local station ST71,ST72, . . . , ST7N, and the detected factors, such as pressure, temperature, flow rates, are transmitted from the designated station to the loop.

Figure 12:
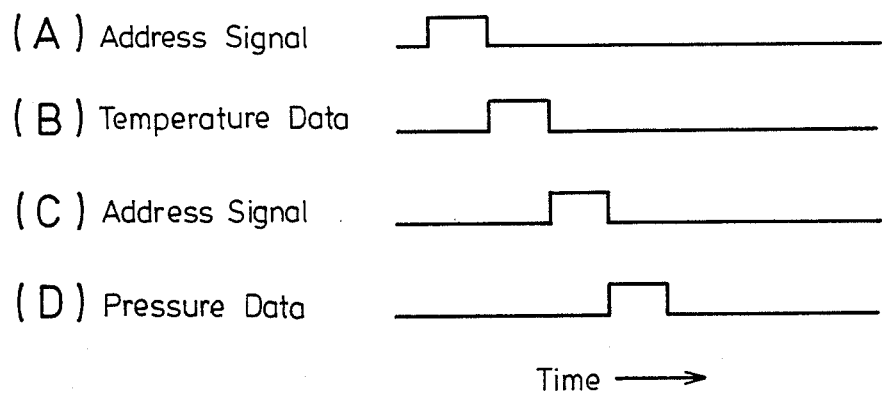
FIG. 12 is a time chart illustrating the operation of the system of FIG. 11.

FIG. 12 is an example of a time chart for illustrating operation of the FIG. 11 system. A local station ST71 is designated by the address signal (A), and temperature data is transmitted at tiem (B). Local station ST72 is designated again by address signal (C) and pressure data is sent out at time (D). Other stations can be designated similarly and detect other factors, such as the flow rate, and similarly transmitted at other times.

A further embodiment may be adapted such that the level of the received signals in each of the stations in the embodiment of FIG. 3 is made constant.

In FIG. 4, assuming the coupling ratios of transmission station ST21 to be 1 and the coupling ratios for the other receiving stations ST22, ... ST2N to be $\alpha 22$, ... $\alpha 2N$, respectively, the following relationship is established between the transmission signals T1, T2, ... TN, and the receiving signals R1, R2, ..., RN of each of the stations ST21, ST22, ... ST2N:

$$R2 = \alpha 22 T1$$
$$T2 = (1 - \alpha 22)T1$$
$$R3 = \alpha 23 T2$$
$$\phantom{R3} = \alpha 23(1 - \alpha 22)T1$$
$$TT3 = (1 - \alpha 23)T2$$
$$\phantom{TT3} = (1 - \alpha 23)(1 - \alpha 22)T1$$
$$\ldots$$
$$RN = \alpha 2N \cdot T, N - 1$$
$$\phantom{RN} = \alpha 2N(1 - \alpha 2, N - 1) \ldots (1 - \alpha 22) \cdot T1$$

In order to make the level of the received signals in each of the receiving stations to be a certain identical value, it is necessary in view of the following condition:

$$R2 = R3 = \ldots = RN$$

to receive the signals at the coupling ratio:

$$\alpha 2N = 1$$
$$\alpha 2K = \alpha 2, K + 1/(1 + \alpha 2, K + 1)$$
$$\phantom{\alpha 2K} = 1/(N - K + 1)$$
$$(K = 2, 3, \ldots N - 1)$$

That is:

$$\alpha 22 = 1/(N - 1)$$
$$\alpha 23 = 1/(N - 2)$$
$$\ldots$$
$$\alpha 2, N - 1 = \tfrac{1}{2}$$
$$\alpha N = 1$$

That is, by previously presetting the foregoing coupling ratios and making them switchable depending, for example, on the state of the transmission or reception, reception can be accomplished while keeping the level of the received signals constant.

In this case, the transmission gain G3 between the stations ST21 and ST2N producing the maximum attenuation can be represented by the following:

$$G3 = 1/(N-1) \approx 1/N (N >> 1) \quad (3)$$

Since the equation (3) does not include the term for $e^{-1}$, the attenuation amount for transmission gain G3 is further decreased as compared with that in the FIG. 3 embodiment, as can be seen with reference to equation (2).

On the other hand, if the attenuation amount is taken to be the same, the number of stations can be increased.

That is, by assuming the gain to be equal in equation (3), as $$Gt1 = G3 = G,$$

while setting the number of stations as N1 for the conventional system, and as N3 for the invention system of the embodiment just described, the following equation is obtained:

$$4e^{-2}N1^{-2} = e^{-1}N3^{-1}$$

The above can be solved into $$N1 = 2e^{-1}\sqrt{G}^{-1}$$
$$N3 = G^{-1} = e^2 N1^2/4$$

Considering the value Gt, for example, as −20 dB (1/100), $$N1 = 7.35$$
$$N3 = 100$$

Accordingly, 100 stations can be connected into the system in the invention, whereas only 7 stations can be connected into a conventional system.

Furthermore, since the level of the received signals is constant, advantageously, the dynamic range of the receiver in each station can be smaller in the invention.

A still further illustrative embodiment (not shown) comprises each station being provided with a detection and comparison function for the level of the received signals in the just described embodiment, wherein the coupling ratio is varied by the output therefrom to thereby maintain the level of the received signals constant. In this case the just described embodiment is no longer necessary.

While the two just described embodiments have been described for the case of the multi-drop type system, they can also be applied to a loop type system.

Figure 13:
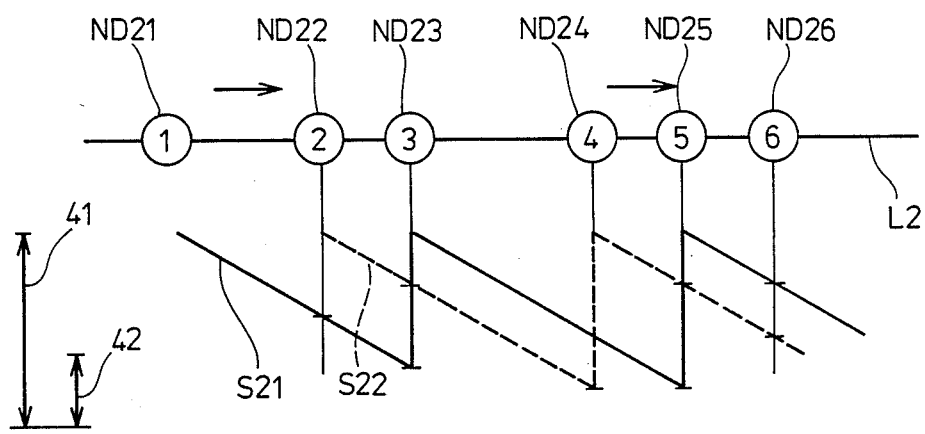
FIG. 13 is an explanatory view of still another illustrative embodiment of the invention wherein a signal level diagram is also depicted.

FIG. 13 is an explanatory view for another illustrative embodiment using a signal level diagram. Although only one way communication is shown, two way communication is usually practiced. FIG. 13 shows a portion of the construction of FIG. 3, and shows an optical transmission line L2 and nodes ND21 . . . ND26 for linking with line L2. Each of the nodes ND2i (i=1, 2, . . .) comprises an optical coupling device A2i of a variable coupling ratio for connection with the line L2 and a station ST2i for connection with the optical coupling device A2i. The coupling ratio of the coupling devices may be selectively changed or varied to an optional value by a control signal C2i by the associated station.

In the optical system of FIG. 13, signals are sent out during transmission while setting the value of coupling ratio $\alpha 2$ of the node to be 1. While the coupling ratio is usually set to a value of less than 1 during reception, if the level of the received signals in the foregoing station lowers to less than a predetermined value due to the attenuation in the signal accompanying the increase in the number of nodes or the distance, the coupling ratio $\alpha 2$ is set to be 1 and the regenerative repeating is performed.

The signal level diagram of FIG. 13 shows a range 41 for the signal level that can be received and a range 42 for the signal level that can be regenerated in each station. If the received signal level is lowered to the regenerative signal level 42, the coupling ratio is switched to 1. The signal S21 sent from station ST21 reaches the regenerative signal level range in nodes ND23 and ND25 and is regeneratively repeated to recover the signal level. Similarly, the signal S22 sent from station ST22 reaches the regenerative signal level range in node ND24 and is regeneratively repeated to recover the signal level. That is, the position at which the signal is regeneratively repeated depends on the stations from which the signal is sent out.

Thus, in the FIG. 13 embodiment, since the repeaters are not inserted in series with the lines, as in the conventional case; rather, passing type optical coupling devices are used, economical advantage and high reliability can be attained in our invention.

Although the foregoing embodiments have been illustrated with respect to the multi-drop type system, loop type systems can be realized, with the invention.

Figure 14:
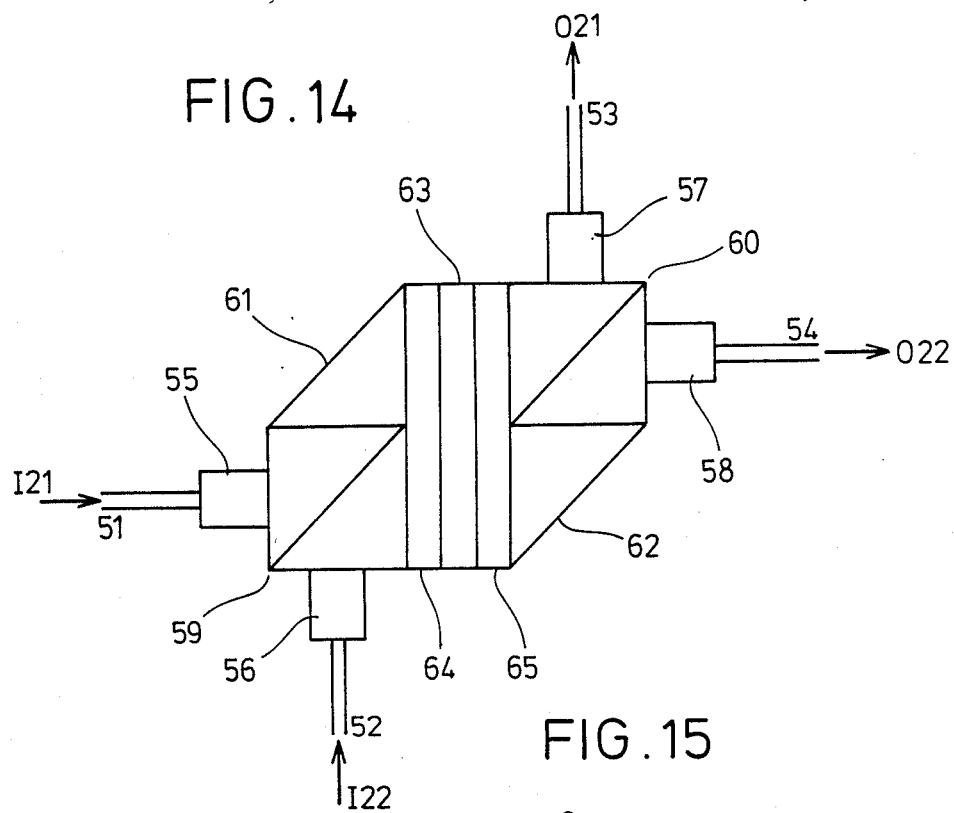
FIG. 14 is an explanatory view depicting another optical coupling device.

FIG. 14 shows another optical coupling device comprising optical fibers 51-54; rod lenses 55-58; polarizing prisms 59,60; orthogonal prisms 61,62; electro-optical shutter element 63 of a plane configuration and matching layers 64,65. A similar device is disclosed, for example, in Japanese Patent Appl. SN No. 81-47702.

One of the polarizing prisms 59, or 60, is arranged so as to face the other of the orthogonal prisms 62 or 61, by way of shutter element 63. Light rays incident from fibers 51,52 are respectively transformed into parallel light rays through the rod lenses 55,56, respectively, and thereafter, enter polarizing prism 59. Polarizing prism 59 splits the light rays, entering by way of rod lenses 55,56, into two optical beams, respectively, whose polarizing planes are perpendicular to each other. The split optical beams are rotated depending on the driven state of the shutter element 63, and then pass through the shutter element 63. Subsequently, operation similar to that for the coupler of FIG. 6, is performed to obtain an optional coupling ratio depending on the driven state of the shutter element 63.

Figure 15:
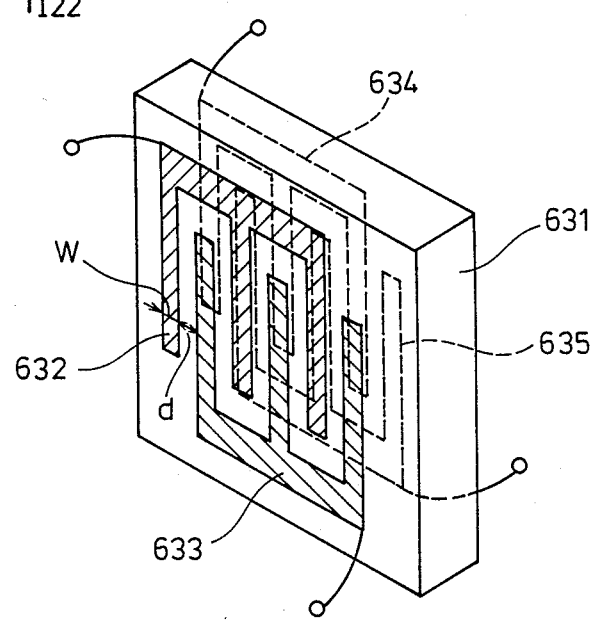
FIG. 15 is an explanatory view depicting a portion of the coupling device of FIG. 14.

FIG. 15 is one example of an electro-optical shutter element which may be used as element 63 in FIG. 14. The element comprises an electro-optic material substrate 631 made for example of PLZT and transparent electrodes 632 and 633 formed in a comb-like configuration. The transparent electrodes 632 and 633 are disposed on one surface of the substrate 631, such that the comb-like electrode brances are engaged with each other along a predetermined direction. Another set of transparent electrodes 634 and 635 are disposed opposing each other on the other side of substrate 631. Since each of electrodes 632-635 are formed such that the electrode branches on one surface is situated between the electrode brances on the other surface, an optical rotating operation due to the electro-optical effect can be obtained substantially over the entire surface due to the electric field caused by a voltage applied between the electrodes.

Although the electro-optic elements, such as PLZT, are used for the optical coupling devices, they are not restricted only to such PLZT. Other similar effect devices may be used, such as for example, magnetic optical elements, such as YIG, or the like.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. An optical communication system comprising an optical transmission line;
a plurality of stations for transmitting and receiving optical signals among said stations through said transmission line;
a plurality of optical couplers connected between said transmission line and to respective ones of said stations, said optical couplers each comprising
a first input terminal connected to said transmission line, and a second input terminal connected to a respective station;
a first output terminal connected to said transmission line, and a second output terminal connected to said respective station;
a polarized light separator comprising a first beam splitter and a first total reflection prism;
a polarized light synthesizer comprising a second beam splitter and a second total reflection prism;
an electro-optic element disposed between said separator and said synthesizer and comprising lead lathanum zirconate titanate material and two electrodes arranged opposite to each other, said element responsive to electrical signals applied to said electrodes selectively switching light from said separator to said synthesizer;
means for connecting said first and second input terminals to said first beam splitter so as to direct selectively light from said input terminals to said first beam splitter and said first total reflection prism;
means for connecting said first and second output terminals to said second beam splitter so as to direct selectively light from said second total reflection prism and said second beam splitter to said first and second output terminals; and
means under control of each station for applying control signals to said electrodes of said electro-optic element of the optical coupler of associated respective station to selectively direct part or all of the light from each of said first and second input terminals and said separator to said synthesizer and each of said first and second output terminals.

2. The system of claim 1, wherein said optical system is of a multi-drop type such that the coupling ratio of each of said optical couplers is set to "1" by an electrical control signal from each of said stations when the station transmits an optical signal while it is set to a predetermined value less than "1" when the station receives an optical signal from any of the other stations.

3. The system of claim 1, wherein said optical system is of a loop type such that the coupling ratio of each of said optical couplers is set to "1" by an electrical control signal from each of said stations when the station transmits an optical signal while it is set to a predetermined value less than "1" when the station receives an optical signal from any of the other stations.

4. The system of claim 3, wherein said system is provided with an additional optical coupler of a variable coupling ratio connected to said optical transmission line and an additional optical transmission line connected to said additional optical coupler.

5. The system of claim 1, wherein the level of optical signal received by each of said stations is kept constant by varying the coupling ratio of each of said optical couplers through an electrical control signal from the station.

6. The system of claim 1, wherein when the level of an optical signal received by each of said stations is less than a predetermined value, the coupling ratio of each of said optical couplers is set to "1" thereby performing a regenerative repeating operation.

* * * * *